United States Patent
Hattori et al.

(10) Patent No.: US 9,672,606 B2
(45) Date of Patent: Jun. 6, 2017

(54) IMAGE PROCESSING DEVICE, IMAGE PROCESSING METHOD, POI INFORMATION CREATION SYSTEM, WARNING SYSTEM, AND GUIDANCE SYSTEM

(71) Applicant: HITACHI, LTD., Tokyo (JP)

(72) Inventors: Hideharu Hattori, Tokyo (JP); Yoshifumi Izumi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 117 days.

(21) Appl. No.: 14/743,614

(22) Filed: Jun. 18, 2015

(65) Prior Publication Data

US 2016/0117848 A1    Apr. 28, 2016

(30) Foreign Application Priority Data

Oct. 27, 2014    (JP) ................................. 2014-218324

(51) Int. Cl.
*G06K 9/00* (2006.01)
*G06T 5/50* (2006.01)
(Continued)

(52) U.S. Cl.
CPC ............ *G06T 5/50* (2013.01); *G06K 9/00818* (2013.01); *G06K 9/38* (2013.01); *G06T 5/009* (2013.01);
(Continued)

(58) Field of Classification Search
CPC . G06T 5/50; G06T 5/009; G06T 2207/10016; G06T 2207/30252; G06K 9/00818; G06K 9/38; H04N 5/2355
See application file for complete search history.

(56) References Cited

U.S. PATENT DOCUMENTS 8,958,662 B1 *  2/2015  Grosz ................... G06T 3/4038
                                                            382/118
9,115,999 B2 *  8/2015  Vorobiev ............... G01C 21/12
(Continued)

FOREIGN PATENT DOCUMENTS

| EP | 1134698 A1 | 9/2001 |
|---|---|---|
| EP | 1397008 A2 | 3/2004 |
| JP | 2010-044445 A | 2/2010 |

OTHER PUBLICATIONS

Partial European Search Report EP Application No. 15172616.3 dated May 6, 2016.
(Continued)

*Primary Examiner* — Shefali Goradia
(74) *Attorney, Agent, or Firm* — McDermott Will & Emery LLP (57) ABSTRACT

Even when the brightness of an image in a video changes, detection of an object in the background is realized by accurately separating the object in the background from the background of the image. An image processing device in accordance with the present invention executes a process of converting a color space of a processing target image and acquiring color information on the converted color space, a process of calculating, for the target image, an average value of the brightness of color information on a target region that contains an object to be detected, and a process of comparing, for the target region, the brightness of color information on each pixel with the calculated average value, a process of generating a corrected image with corrected brightness/darkness, and a process of extracting the object on the basis of the corrected image (See FIG. 1).

13 Claims, 7 Drawing Sheets

(51) Int. Cl.
*G06K 9/38* (2006.01)
*G06T 5/00* (2006.01)
*H04N 5/232* (2006.01)

(52) U.S. Cl.
CPC ............... *H04N 5/23229* (2013.01); *G06T 2207/10016* (2013.01); *G06T 2207/30252* (2013.01)

(56) References Cited

U.S. PATENT DOCUMENTS

| | | | |
|---|---|---|---|
| 9,374,374 B2* | 6/2016 | Steinberg | H04L 63/10 |
| 2003/0108223 A1* | 6/2003 | Prokoski | A61B 5/1176 |
| | | | 382/115 |
| 2007/0047834 A1 | 3/2007 | Connell | |
| 2007/0092153 A1* | 4/2007 | Kagaya | H04N 1/622 |
| | | | 382/254 |
| 2012/0327240 A1* | 12/2012 | Vorobiev | G01C 21/12 |
| | | | 348/148 |

OTHER PUBLICATIONS

Hsiu-Ming Yang et al., "Traffic Sign Recognition in Disturbing Environments", In: Correct System Design, Jan. 1, 2003, Springer Int'l. Publishing, vol. 2871 pp. 252-261.

H.D. Cheng et al., "Contrast enhancement based on a novel homogeneity measurement", Pattern Recognition 36 (2003) pp. 2687-2697.

Chien-Chuan Lin et al., "Road Sign Recognition with Fuzzy Adaptive Pre-Processing Models", Sensors, (2012), 12, pp. 6415-6433.

* cited by examiner

| Bit rate | Gray levels of histograms |
|---|---|
| 20M/bps | 256 Gray levels |
| 10M/bps | 128 Gray levels |
| 5M/bps | 64 Gray levels |
| 2.5M/bps | 32 Gray levels |

IMAGE PROCESSING DEVICE, IMAGE PROCESSING METHOD, POI INFORMATION CREATION SYSTEM, WARNING SYSTEM, AND GUIDANCE SYSTEM

CLAIM OF PRIORITY

The present application claims priority from Japanese patent application No. JP2014-218324 filed on Oct. 27, 2014, the content of which is hereby incorporated by reference into this application.

BACKGROUND

Technical Field

The present invention relates to an image processing device, an image processing method, a POI information creation system, a warning system, and a guidance system. For example, the present invention relates to an image processing technique for detecting an object in a video captured with an imaging device, such as a smartphone mounted on a running vehicle.

Background Art

In recent years, there has been an increased need to create rich content that can be provided as supplementary information like map information, by detecting attachments on a road contained in an image, using a video captured with an imaging device, such as a smartphone or a drive recorder. In order to detect such attachments on a road, there is known a technique proposed in Patent Document 1, for example. Patent Document 1 describes performing edge detection on an image and color conversion of the image, and detecting a speed sign from a vehicle-mounted video with reference to the average value of color in the image, the shape of the speed sign, and the like.

RELATED ART DOCUMENTS

Patent Documents

Patent Document 1: JP 2010-044445 A

SUMMARY

However, when an image is captured with a vehicle-mounted imaging device, the brightness of an image in a video will gradually change with a change in the running direction of the vehicle in accordance with the driving route on the road, that is, in accordance with a change in light among forward light, backlight, sunlight, and the like. Therefore, even when a "technique of detecting a target object from each image using the average value of color in the image" is used, it would be impossible to separate the object in the background from the background of the image. Thus, there is a problem in that the object in the background cannot be detected.

The present invention has been made in view of the foregoing circumstances. The present invention provides a technique for, even when the brightness of an image in a video changes, realizing detection of an object in the background by accurately separating the object in the background from the background of the image.

In order to solve the above problem, an image processing device in accordance with the present invention executes a process of converting a color space of a processing target image and acquiring color information on the converted color space, a process of calculating, for the target image, the average value of the brightness of color information on a target region that contains an object to be detected, a process of comparing, for the target region, the brightness of color information on each pixel with the calculated average value to generate a corrected image with corrected brightness/darkness, and a process of extracting the object on the basis of the corrected image.

Further features related to the present invention will become apparent from the description of the specification and the accompanying drawings. In addition, embodiments of the present invention can be realized by any elements or any combination of elements as well as the following detailed description and the appended claims.

It should be appreciated that the description of the specification contains merely typical examples, and should not limit, in any sense, the scope of the claims of the present invention or examples of the application of the present invention.

According to the present invention, it is possible to, even when the brightness of an image in a video changes, allow detection of an object in the background by accurately separating the object in the background from the background of the image.

DETAILED DESCRIPTION OF THE EMBODIMENT(S)

In general, in order to detect attachments on roads as supplementary information like map information, it is necessary to run a vehicle through all routes to capture images of the attachments on the roads, which can result in a high investigation cost. Further, attachments on new roads or roads that have been changed by construction cannot be timely reflected in the map information. Thus, an embodiment of the present invention allows timely detection of attachments on roads using images that are captured by users of a plurality of (an indefinite number of) smartphones.

By the way, when a video captured with a smartphone is transferred to a server, there is a problem in that video data cannot be efficiently collected from an indefinite number of users due to the upper limit of the data communication amount. Meanwhile, when low bit-rate video data is transmitted so that the data transmission amount on a smartphone will not exceed the upper limit of the monthly fee, there is a problem in that the contours of objects become unclear due to the influence of block noise and the like, thus failing to detect attachments on roads in the background. In particular, in Patent Document 1 above, if a low bit-rate image is transmitted, some contours (e.g., vertical lines, horizontal lines, and characters) in the image become unclear. Thus, even when the average value of color in each image is used, it would be impossible to separate an object in the background from the background of the image, thus failing to detect the object in the background. Thus, according to an embodiment of the present invention, there is provided a technique for enabling detection of a desired object even when low bit-rate image data is used.

That is, according to an embodiment of the present invention, there is provided an image processing device and method for, even when the brightness of an image in a video changes, or some contours in an image become unclear due to low bit-rate image transmission, realizing detection of an object in the background by separating the object in the background from the background of the image.

Hereinafter, embodiments of the present invention will be described with reference to the accompanying drawings. In the accompanying drawings, elements that have the same function may be denoted by the same reference numerals. Although the accompanying drawings show specific embodiments and implementations in accordance with the principle of the present invention, they are merely illustrative and should not be used to narrowly construe the present invention.

The present embodiment contains fully detailed description for one of ordinary skilled in the art to carry out the present invention. However, it should be appreciated that other implementations and embodiments are also possible, and any change in the configuration and structure as well as replacement of a variety of elements is possible within the spirit and scope of the present invention. Thus, the present invention should not be limited to the following description.

Further, as described below, embodiments of the present invention may be implemented by any of software that runs on a general-purpose computer, dedicated hardware, or a combination of software and hardware.

Hereinafter, each of processes in embodiments of the present invention will be described as being performed by "each processing unit (e.g., brightness/darkness correction unit) as a program" as a subject (i.e., subject that performs an operation). However, since it is only after a program is executed by a processor (e.g., CPU) that the program can perform a given process using a memory and a communication port (i.e., a communication control device), each process may also be described as being performed by a processor as a subject.

Figure 1:
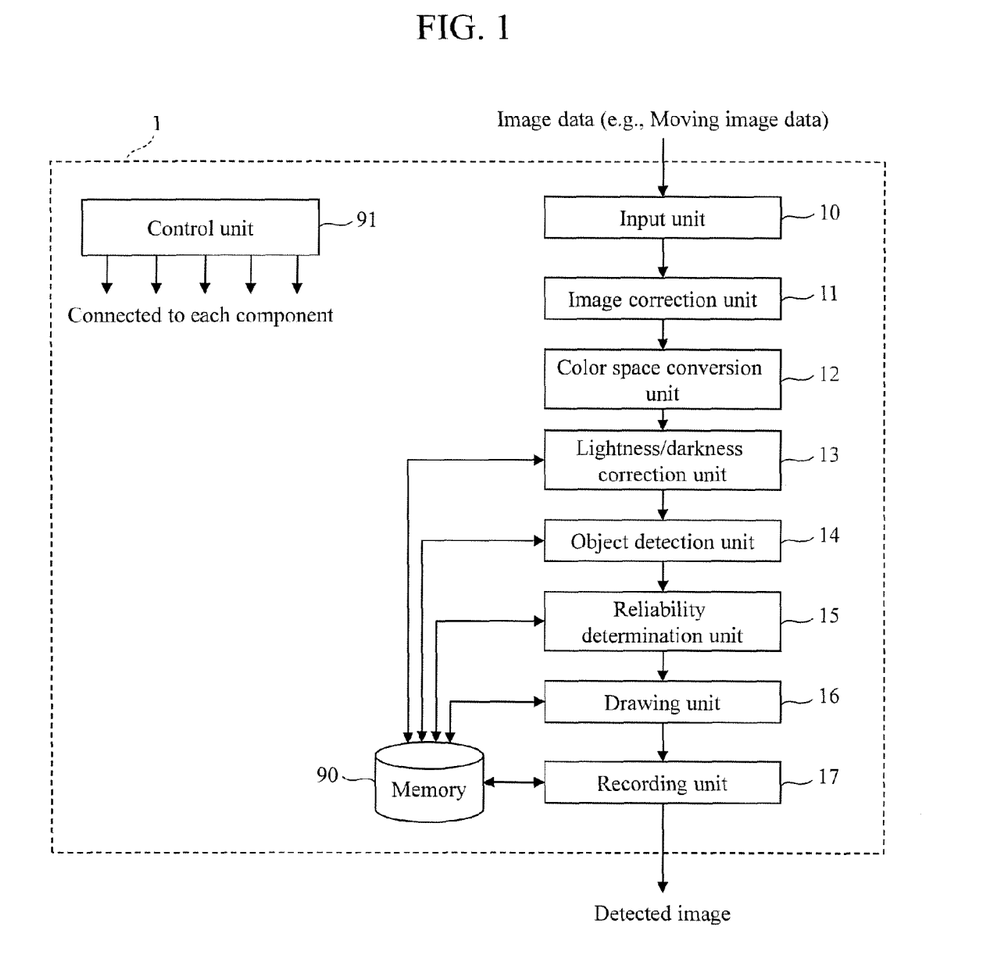
FIG. 1 is a block diagram showing the function of an image processing device in accordance with an embodiment of the present invention.

(1) First Embodiment
<Functional Configuration of Image Processing Device>
FIG. 1 is a block diagram showing the functional configuration of an image processing device in accordance with an embodiment of the present invention. An image processing device 1 includes an input unit 10, an image correction unit 11, a color space conversion unit 12, a brightness/darkness correction unit 13, an object detection unit 14, a reliability determination unit 15, a drawing unit 16, a recording unit 17, and a control unit 91. The image processing device may be mounted in a portable mobile terminal device, such as a smartphone, or be mounted in a server that is connected to a portable mobile terminal device via a network as described below (second to fourth embodiments).

The input unit 10, the image correction unit 11, the color space conversion unit 12, the brightness/darkness correction unit 13, the object detection unit 14, the reliability determination unit 15, the drawing unit 16, and the recording unit 17 of the image processing device 1 may be implemented by programs or be implemented as modules.

The input unit 10 receives moving image data. For example, the input unit 10 may acquire encoded still image data in JPG, Jpeg2000, PNG, or BMP format, which has been captured by an imaging device such as a drive recorder at predetermined time intervals, as an input image. In addition, the input unit 10 may also extract still image data of frames of predetermined intervals from moving image data in Motion JPEG, MPEG, H.264, or HD/SDI format, as an input image. Further, the input unit 10 may use an image, which has been acquired by an imaging device via a bus, a network, or the like, as an input image. The input unit 10 may also use an image, which has been already stored in a detachable recording medium, as an input image as described below.

The image correction unit 11 creates a corrected image without expansion by correcting the aspect ratio of the input image.

The color space conversion unit 12 creates an image by converting the color space of the input image.

The brightness/darkness correction unit 13, using brightness information on the color of a past image stored in the memory 90 and brightness information on the color of the current image, determines the amount of change in the brightness of the color of the current image, and creates a image by correcting brightness/darkness of the current image using the amount of change in the brightness.

The object detection unit 14 determines a threshold value for separating a target object from the image with the corrected brightness/darkness, and detects the object in the background by separating the object in the background from the background of the image using the threshold value. In addition, the object detection unit 14 identifies the detected object using a reference image and histograms with a reduced number of gray levels.

The reliability determination unit 15 determines the detection frequency from the latitude and longitude of the detected object, and determines the reliability of the detected object on the basis of the detection frequency.

The drawing unit 16 draws a detection frame on the image such that the detection frame surrounds the object detected with the object detection unit 14.

The recording unit 17 stores the image, which has been obtained by drawing a detection frame on the original image with the drawing unit 16, in a memory.

The control unit 91 is implemented by a processor and is connected to each component of the image processing device 1. Each component of the image processing device 1 is operated by autonomous operation of each component described above or in response to an instruction from the control unit 91.

As described above, the image processing device 1 in accordance with the present embodiment is characterized by changing the proportion of enhancement of brightness/darkness of each image using the image obtained through color space conversion with the color space conversion unit 12 and the amount of change in the brightness of the image (i.e., brightness of the color) calculated with the brightness/darkness correction unit 13, and determines, with the object detection unit 14, a threshold value from the image with the corrected brightness/darkness to detect an object in the background by separating the object in the background from the background of the image using the threshold value, and identifies the detected object using a reference image and histograms with a reduced number of gray levels.

<Hardware Configuration of Image Processing Device>

Figure 2:
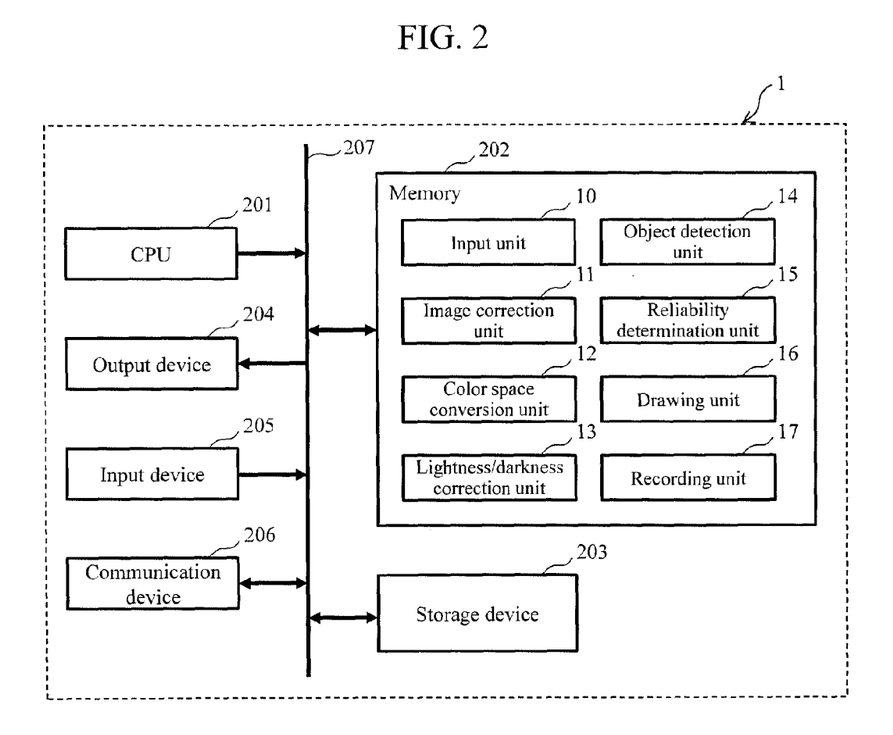
FIG. 2 is a diagram showing an exemplary hardware configuration of an image processing device in accordance with an embodiment of the present invention.

FIG. 2 is a diagram showing an exemplary hardware configuration of the image processing device 1 in accordance with an embodiment of the present invention. The image processing device 1 includes a CPU (i.e., processor) 201 that executes various programs, a memory 202 that stores various programs, a storage device (which corresponds to a memory 90) 203 that stores various data, an output device 204 for outputting a detected image, an input device 205 for inputting an instruction from a user, an image, and the like, and a communication device 206 for communicating with other devices. Such components are mutually connected with a bus 207.

The CPU 201 reads various programs from the memory 202 and executes them as needed.

The memory 202 stores as programs the input unit 10, the image correction unit 11, the color space conversion unit 12, the brightness/darkness correction unit 13, the object detection unit 14, the reliability determination unit 15, the drawing unit 16, and the recording unit 17.

The storage device 203 stores past images (i.e., images of up to an image N−1 described below) that have been captured prior to a processing target image (i.e., image N described below), each pixel value of an image generated by the brightness/darkness correction unit 13, a calculated threshold value for each image, data on a reference image, and the like.

The output device 204 includes devices, such as a display, a printer, and a speaker. For example, the output device 204 displays data generated by the drawing unit 16 on a display screen.

The input device 205 includes devices, such as a keyboard, a mouse, and a microphone. An instruction (which includes decision of a processing target image) from a user is input to the image processing device 1 by the input device 205, for example.

The communication device 206 is not an essential configuration of the image processing device 1. Thus, when a portable mobile terminal includes a communication device, the image processing device 1 need not hold the communication device 206. The communication device 206 performs operations of receiving data (which includes an image) transmitted from another device (i.e., server) connected via a network and storing the data in the storage device 203.

<Configuration and Operation of Each Unit>

Hereinafter, the configuration and operation of each component will be described in detail.

(i) Image Correction Unit 11

There are cases where the aspect ratio of an image displayed on the screen at a time point when a video is captured differs from the aspect ratio of the image at a time point when the captured video is stored in a memory. The image correction unit 11 executes a process of correcting an image that has expanded due to such difference in the aspect ratio. Herein, the width and the height of an image that is displayed on the screen when a video is captured with a smartphone, a drive recorder, or the like are indicated by d_h and d_v, respectively, and the width and the height of the image when the video is stored in a memory are indicated by s_h and s_v, respectively. At this time, the image correction unit 11 calculates the ratio hr of the image width using Formula 1 and calculates the ratio vr of the image height using Formula 2.

$$hr=d\_h/s\_h \quad \text{[Formula 1]}$$

$$vr=d\_v/s\_v \quad \text{[Formula 2]}$$

If hr≥vr, the image correction unit 11 determines the image width c_h and the image height c_v of a corrected image using Formulae 3 and 4 below. Meanwhile, if hr<vr, the image correction unit 11 determines the image width c_h and the image height c_v of a corrected image using Formulae 5 and 6 below.

$$c\_h=d\_h/hr \quad \text{[Formula 3]}$$

$$c\_v=d\_v/hr \quad \text{[Formula 4]}$$

$$c\_h=d\_h/vr \quad \text{[Formula 5]}$$

$$c\_v=d\_v/vr \quad \text{[Formula 6]}$$

As described above, the image correction unit 11 corrects the aspect ratio of an input image so that the width and the height of the image become the image width c_h and the image height c_v, respectively, thereby creating an image with corrected expansion. It should be noted that when the aspect ratio of an image at a time point when the image was captured is the same as the aspect ratio of the image at a time point when the image is stored in a memory, the image stored in the memory can be used as is as the input image (because the image has not expanded). Thus, the process of correcting the aspect ratio with the image correction unit 11 is not necessary.

(ii) Color Space Conversion Unit 12

The color space conversion unit 12 generates an image by converting a RGB color space of the input image into a Lab color space, for example. When the color space of the input image is converted into a Lab color space, the value L, the value a, and the value b of the image are acquired. The value L indicates information such as brightness, and the values a and b indicate color information.

(iii) Brightness/Darkness Correction Unit 13

Figure 3:
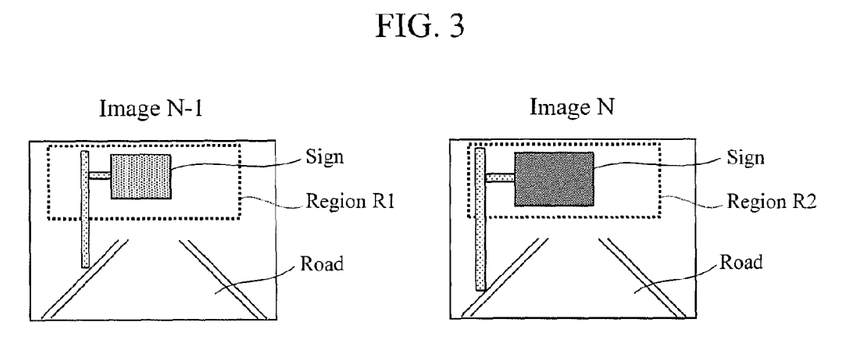
FIG. 3 is a diagram for illustrating an exemplary operation of a brightness/darkness correction unit 13.

FIG. 3 is a diagram for illustrating an exemplary operation of the brightness/darkness correction unit 13. Provided that an image, which is obtained by converting the color space of an image N into a Lab color space with the color space conversion unit 12, is an image NA, the brightness/darkness correction unit 13 calculates the average value aveR2 of color information (i.e., brightness of color: the value a or the value b) in a region R2 of the image NA using the color information (i.e., the value a or the value b) on the image NA. In addition, the brightness/darkness correction unit 13 reads the average value aveR1 of the brightness of color in a region R1 of an image N−1 from the memory (which corresponds to the storage device 203).

Next, the brightness/darkness correction unit 13 calculates the average value aveRN by blending the average value aveR1, which has been obtained by blending the average value of the brightness (i.e., the value a or the value b) of the color of each of the past images of up to the image N−1, and the average value aveR2 of the brightness of the color of the image N, using Formula 7. It should be noted that in Formula 7, C1=C2+C3. Herein, in order to make a change in the brightness of color from the past images gentle, the weight C2 of the past images may be increased, while in order to drastically change the brightness of color toward the current image, the weight C3 of the current image may be increased. However, when the current image is prioritized too much by increasing C3, there may be cases where brightness/darkness cannot be corrected accurately. Thus, the past images should be taken into consideration to a certain degree (i.e., the weight C2 should not be reduced too much). For example, in order to make a change in the brightness of color from the past images gentle, C2 is set to 0.9, and C3 is set to 0.1. Meanwhile, in order to drastically change the brightness of color toward the current image, C2 and C3 may be set to 0.5.

$$aveRN = aveR1 \times C2/C1 + aveR2 \times C3/C1 \qquad \text{[Formula 7]}$$

In addition, the brightness/darkness correction unit 13 calculates the magnification value v using Formula 8 below. It should be noted that in Formula 8, if the value of aveR1 is greater than or equal to the value of aveR2, E1 is set to aveR2 and E2 is set to aveR1, while if the value of aveR1 is less than the value of aveR2, E1 is set to aveR1 and E2 is set to aveR2. It should be noted that the magnification value v may be a fixed value.

$$v = E2/E1 \qquad \text{[Formula 8]}$$

Further, the brightness/darkness correction unit 13 corrects the image N using Formula 9 so that pixels that are darker than the average value of the brightness of color in the region R2 of the image N become darker, and pixels that are brighter than the average value of the brightness of color in the region R2 of the image N become brighter. When such correction is performed, it becomes possible to allow detection of an object that is buried in and is difficult to be seen in the input image. It should be noted that in Formula 9, symbol cn indicates the value a or the value b of each pixel of the image NA.

$$cnCor = cn - (aveR2 - cn) \times v \qquad \text{[Formula 9]}$$

The brightness/darkness correction unit 13 determines the value cnCor for each pixel, and creates an image NB by correcting the brightness/darkness of the image NA.

(iv) Object Detection Unit 14

Figure 4:
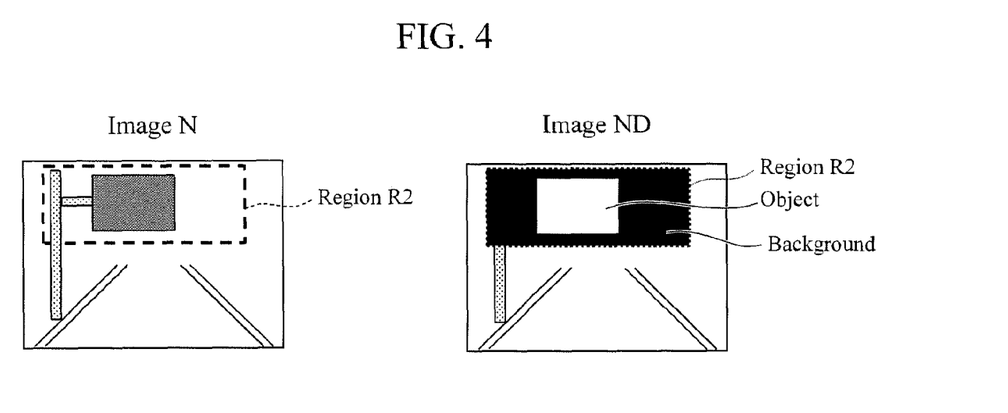
FIG. 4 is a diagram for illustrating an exemplary operation of an object detection unit 14.

The object detection unit 14 determines the threshold value Th for each image using Formula 10 below.

$$Th = aveRN + \alpha \qquad \text{[Formula 10]}$$

Herein, symbol α indicates a correction value for the threshold value when only brighter pixels or darker pixels are extracted, and is a parameter to allow a target object to be cut out more easily.

When each pixel of the image NA has the value a, the object detection unit 14, using the threshold value Th determined for each image while setting a to a positive value, sets each pixel value to the value s (e.g., s=255) if each pixel value≥Th, and sets each pixel value to the value t (e.g., t=0) if each pixel value<Th, thereby creating an image of the object separated from the background. Accordingly, a brighter object can be separated efficiently. Alternatively, when each pixel of the image NA has the value b, the object detection unit 14, using the threshold value Th determined for each image while setting a to a negative value, sets each pixel value to the value s s=255) if each pixel value≤Th, and sets each pixel value to the value t (e.g., t=0) if each pixel value>Th, thereby creating an image of the object separated from the background. Accordingly, a darker object can be separated efficiently.

Thus, the process of the object detection unit 14 can, regarding the region R2 of the image N in FIG. 4, separate the object from the background shown in the image ND after detection of the object, for example.

Figure 5:
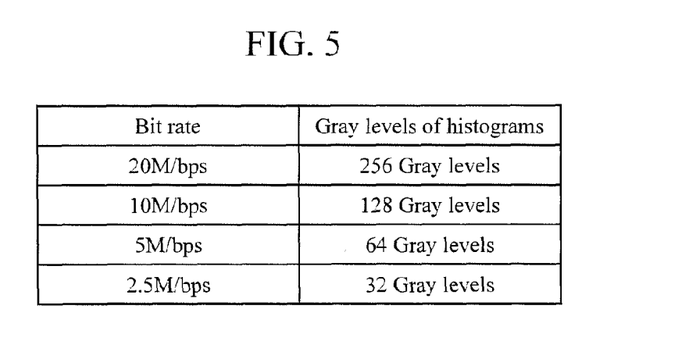
FIG. 5 is a diagram for illustrating an exemplary number of gray levels in accordance with the bit rate of the object detection unit 14.

Further, the object detection unit 14 executes a process for identifying what sign is indicated by the detected object. In such a case, the object detection unit 14 reads from the memory 90 a reference image (which is prepared as a database or the like in advance) of a sign to be identified, and creates, for each of the reference image and the detected object image (which are compared as the RGB images), a histogram A (i.e., histogram of the reference image) with a reduced number of gray levels in accordance with the bit rate (i.e., the bit rate of the reference image is adjusted to the bit rate of the processing target image N) and a histogram B (i.e., histogram of the detected image), as shown in FIG. 5. Then, the object detection unit 14 calculates the similarity between the created histograms A and B to determine whether the detected object is the sign to be identified (i.e., determine the similarity depending on whether the shapes of the histograms are close (whether the Bhattacharyya distance is short)). Regarding the similarity, B32(c) that is based on the Bhattacharyya distance between the histograms is determined for each of RGB as shown in Formula 11 below, and then, the similarity R is calculated using the thus determined r-component-related B32(r), g-component-related B32(g), and b-component-related B32(b). Herein, symbol c represents one of r, g, or b.

[Formula 7]

$$B32(c) = \sqrt{1 - \frac{1}{HSUM} \sum_{I=0}^{31} \sqrt{HA(I) \times HB(I)}} \qquad \text{Formula 11}$$

$$R = \sqrt{B32(r)^2 + B32(g)^2 + B32(b)^2},$$

where HA(I) represents the frequency of the gray-level value I of the histogram A, and HSUM represents the total number of bins of the histogram.

Referring to FIG. 5, regarding an image with a bit rate of 10 M/bps, for example, it is preferable to reduce the number of gray levels to (adjust the number of gray levels to) 128 to determine the similarity between histograms. Meanwhile, regarding an image with a bit rate of 7 M/bps, it is preferable to reduce the number of gray levels to a value that is greater than or equal to 64 and less than or equal to 128 to determine the similarity between histograms. As described above, determining the similarity between histograms with a reduced number of gray levels can determine the similarity between the reference image and the detected object image while suppressing the influence of block distortion of the low bit-rate image. That is, similarity can be determined even when the detected object image has degraded. Further, it is also possible to, for determination of the similarity between histograms, create an identifier from feature quantities of images through machine learning using the prior-art neural network, and identify the detected object using the identifier. That is, when a plurality of reference images, which are determined to have high similarity, are detected, which image is correct (seems correct) as a detected object is identified using the identifier using a neural network.

(v) Reliability Determination Unit 15

Figure 6:
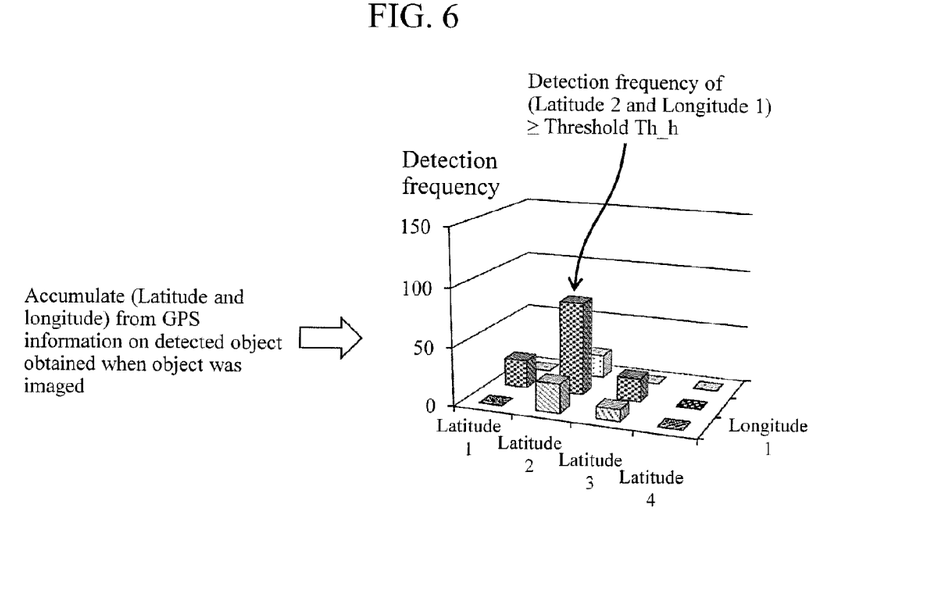
FIG. 6 is a diagram for illustrating an exemplary operation of a reliability determination unit 15.

The reliability determination unit 15, as shown in FIG. 6, determines the latitude and longitude from the GPS information on the detected object obtained when the object was imaged, accumulates the detection frequency of the position, and stores it in the memory 90 (which corresponds to the storage device 203). That is, detection results obtained by a plurality of users or a plurality of detection results obtained by the same user are accumulated. Then, the reliability determination unit 15 compares the accumulated detection frequency with a preset threshold value Th_h, and, if the detection frequency is greater than or equal to the threshold value Th_h, determines that the reliability C of (the latitude and longitude of) the detected object is high. The reliability is determined as described above because the moving speed and the imaging position (i.e., height and the running position on the road) may differ depending on the imaging moving object (i.e., vehicle), and thus that the measured latitude and longitude may slightly differ.

(vi) Drawing Unit 16

Figure 7:
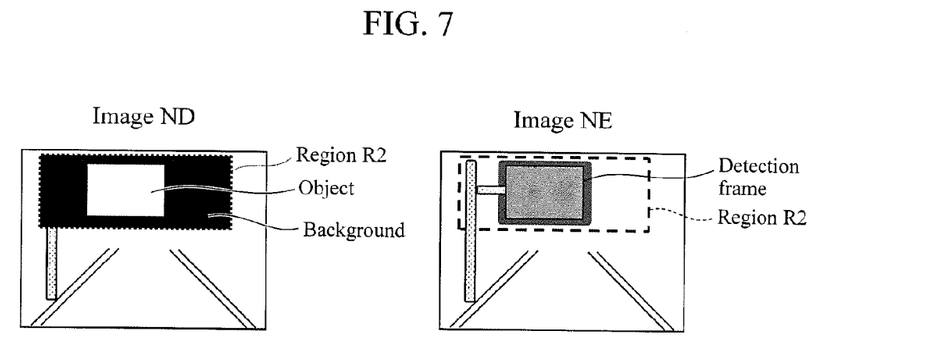
FIG. 7 is a diagram for illustrating an exemplary operation of a drawing unit 16.

As shown in FIG. 7, the drawing unit 16, when the reliability C is determined to be high, draws a detection frame on the image N in FIG. 3 such that the detection frame surrounds the object detected with the object detection unit 14 (see the image NE). Meanwhile, when the reliability C is determined to be low (i.e., when the detection frequency is below the threshold value Th_h), the drawing unit 16 does not draw a detection frame on the image N.

(vii) Recording Unit 17

The recording unit 17 stores the image, which has been obtained by drawing the detection frame on the original image N with the drawing unit 16, in the memory 90.

<Processing Procedures of the Image Processing Device>

Figure 8:
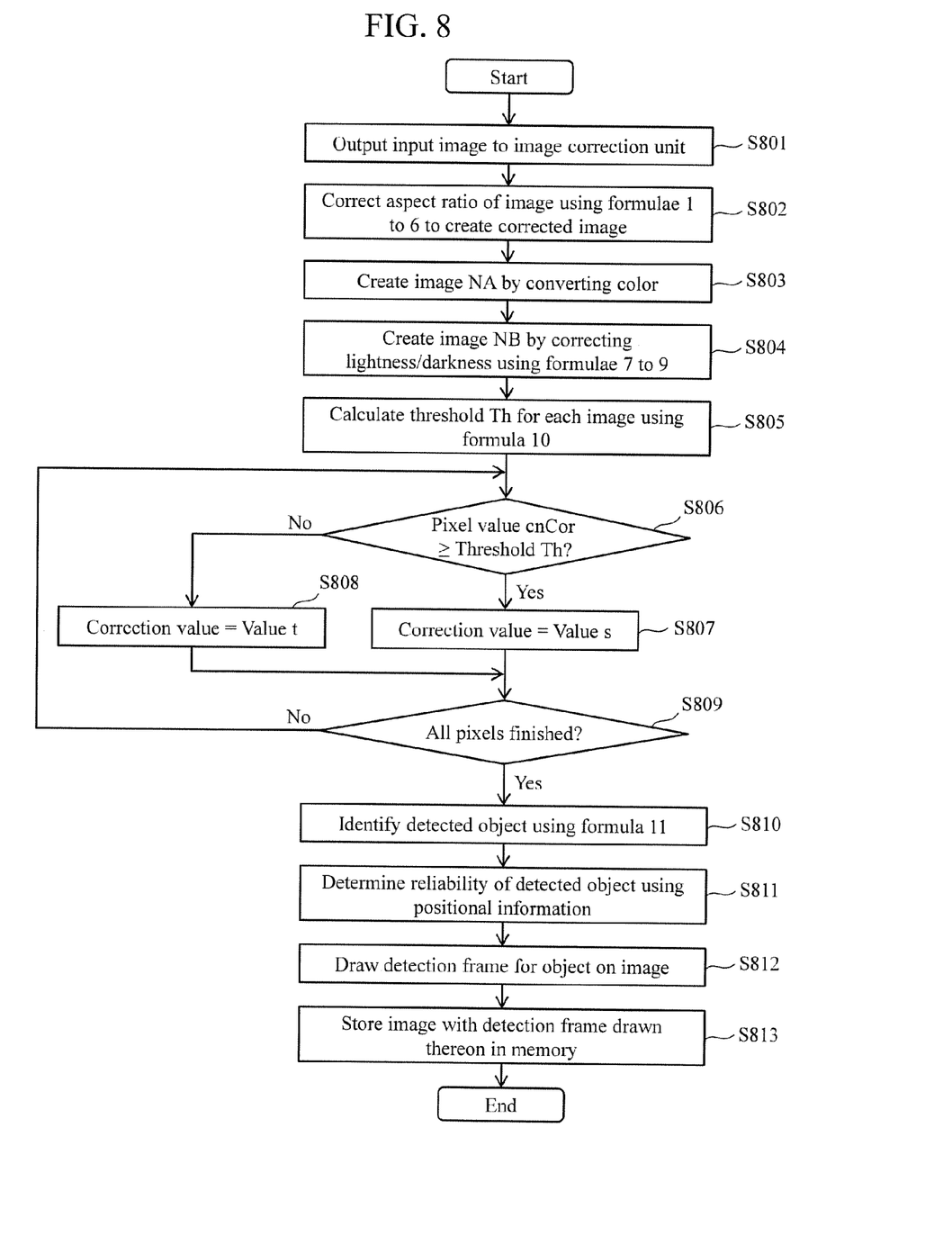
FIG. 8 is a flowchart for illustrating the entire operation of an image processing device 1.

FIG. 8 is a flowchart for illustrating the operation of the image processing device 1 in accordance with an embodiment of the present invention. Hereinafter, each processing unit (i.e., the input unit 10 or the image correction unit 11) will be described as a subject that performs an operation. However, it is also possible to regard the CPU 201 as a subject that performs an operation and read the CPU 201 as executing each processing unit as a program.

(i) Step 801

The input unit 10 receives an input image, and outputs the input image to the image correction unit 11.

(ii) Step 802

The image correction unit 11 corrects the aspect ratio of the image using Formulae 1 to 6 above to create a corrected image.

(iii) Step 803

The color space conversion unit 12 determines an image NA by converting the corrected image N output from the image correction unit 11, that is, an RGB color space image into a Lab color space image, for example.

(iv) Step 804

The brightness/darkness correction unit 13 calculates the average value aveR2 of the brightness of color in the region R2 of the image N from the image NA determined by the color space conversion unit 12. In addition, the brightness/darkness correction unit 13 reads from the memory 90 the average value aveR1 of the brightness of color in the region R1 of the image N−1 (i.e., image captured prior to the image N). Then, the brightness/darkness correction unit 13 generates the image NB with corrected brightness/darkness using Formulae 7 to 9 above.

(v) Step 805

The object detection unit 14 determines the threshold value Th for each image using Formula 10 above.

(vi) Step 806

The object detection unit 14 compares each pixel value cnCor of the image NB with the corrected brightness/darkness with the threshold value Th. That is, when each pixel of the image NB has the value a, the process proceeds to step 807 if cnCor≥the threshold value Th. Meanwhile, if cnCor<the threshold value Th, the process proceeds to step 808. It should be noted that when each pixel of the image NB has the value b, the process proceeds to step 807 if cnCor≤the threshold value Th. Meanwhile, if cnCor>the threshold value Th, the process proceeds to step 808.

(vii) Step 807

Regardless of whether each pixel of the image NB has the value a or the value b, the object detection unit 14 sets the correction value to the value s (e.g., 255).

(viii) Step 808

Regardless of whether each pixel of the image NB has the value a or the value b, the object detection unit 14 sets the correction value to the value t (e.g., 0).

(ix) Step 809

The object detection unit 14 repeats steps 806 to 808 above until when correction values for all pixels in the target image are determined. By repeating steps 806 to 809, it becomes possible to, regarding the region R2 of the image N in FIG. 4, separate the object from the background shown in the image ND after detection of the object, for example.

(x) Step 810

The object detection unit 14 reads a reference image from the memory 90 (i.e., storage device 203), and crates a histogram with a reduced number of gray levels for each of the detected object image and the reference image, and then determines the similarity R using Formula 11 above. When the similarity R is high (i.e., when similarity R≤the threshold value Th_R: since the similarity R is calculated as the Bhattacharyya distance above, "high similarity means a short distance"), the object detection unit 14 determines that the detected object is a sign to be identified. It is also possible to use an identifier that is determined through machine learning using a neural network as described above, and conduct determination of whether the detected object is a sign to be identified in addition to the above determination using the determination result of the identifier.

(xi) Step 811

The reliability determination unit 15 accumulates the positional information (i.e., latitude and longitude) on the detected object obtained when the object was imaged, and determines that the reliability C of (the latitude and longitude of) the detected object is high if the accumulated detection frequency is greater than or equal to the threshold value Th_h. Meanwhile, the reliability C is determined to be low if the detection frequency is less than the threshold value Th_h.

(xii) Step 812

The drawing unit 16, if the reliability C is high, draws a detection frame on the image N such that the detection frame surrounds the object detected with the object detection unit 14. If the reliability C is low, the drawing unit 16 does not draw a detection frame on the image N.

(xiii) Step 813

The recording unit 17 stores the image, which has the detection frame of the object drawn thereon, in the memory 90 (which corresponds to the storage device 203).

According to an embodiment of the present invention, an image NB is created by correcting the brightness/darkness of the image N using aveR1, which is obtained by blending the average value of the brightness of the color of each of the past images of up to the image N−1, and the average value aveR2 of the brightness of the color of the processing target image N, and determines the threshold value Th for each image NB. Thus, using the threshold value Th can separate the object in the background from the background of the image N.

In addition, as the similarity between the detected object and a sign to be identified is determined using histograms with a reduced number of gray levels in accordance with the bit rate, it is possible to, even when the contours of objects in the image are unclear, identify the detected object by suppressing the influence of block noise contained in the low bit-rate image. Further, it is also possible to, by accumulating the positional information on the detected object and determining the detection frequency, determine the positional information on the detected object more accurately.

As described above, by creating an image by emphasizing the brightness/darkness of a target image using the brightness information on the past images and the target image and determining a threshold value for separating a region in each image, it becomes possible to, even when the brightness of an image in a video changes depending on the running direction of the moving vehicle, detect an object in the background by separating the object in the background from the background of the image. In addition, it also becomes possible to suppress the data communication amount of smartphones and the like, and detect an object from a low bit-rate image together with more accurate positional information, and identify the detected object. Further, by detecting an object from videos captured by vehicle-mounted smartphones of an indefinite number of users and determining a more accurate position from the detection frequency of the positional information, it also becomes possible to timely detect attachments on new roads or roads that have been changed by construction.

(2) Second Embodiment

Figure 9:
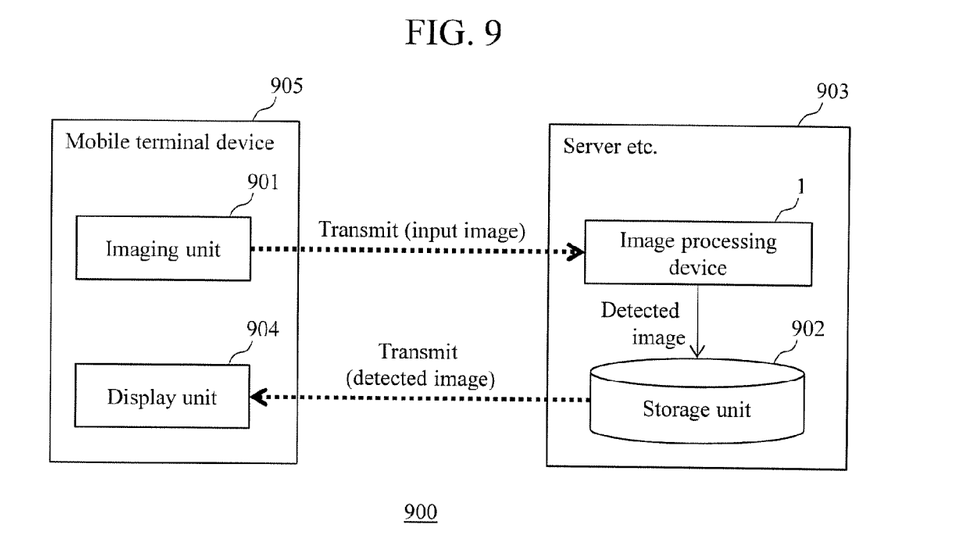
FIG. 9 is a diagram showing the schematic configuration of a POI information creation system that has mounted thereon the image processing device of the present invention.

FIG. 9 is a functional block diagram showing the configuration of a POI (Point of Interest) information creation system 900 in accordance with the second embodiment of the present invention. The POI information creation system 900 includes a server etc. 903 and a mobile terminal device 905.

The mobile terminal device 905 is a device like a smartphone, for example, and includes an imaging unit 901 for capturing image data, and a display unit 904 for displaying a detected image transmitted from the server etc. 903. The mobile terminal device 905 also includes, though not shown, a communication device for transmitting image data to the server etc. 903 and receiving data transmitted from the server etc. 903.

The server etc. 903 includes the image processing device 1 that performs image processing in accordance with the first embodiment of the present invention on the image data transmitted from the mobile terminal device 905, and a storage unit 902 that stores a detected image output from the image processing device 1. The server etc. 903 also includes, though not shown, a communication device for receiving image data transmitted from the mobile terminal device 905 and transmitting the detected image data to the mobile terminal device 905.

The image processing device 1 detects objects, such as attachments on roads, from image data captured with the imaging unit 901. The image processing device 1 sets a specific signboard, such as facility information or spot information, on a reference image to detect a specific signboard from the image data.

The display unit 904 displays a detected image, such as a specific signboard, transmitted from the server etc. 903 on a display screen of the mobile terminal device (e.g., smartphone) 905.

According to the second embodiment, it is possible to provide a POI information creation system by detecting a specific signboard from a video captured with a vehicle-mounted smartphone and storing a set of the detected image of the specific signboard and the positional information.

(3) Third Embodiment

Figure 10:
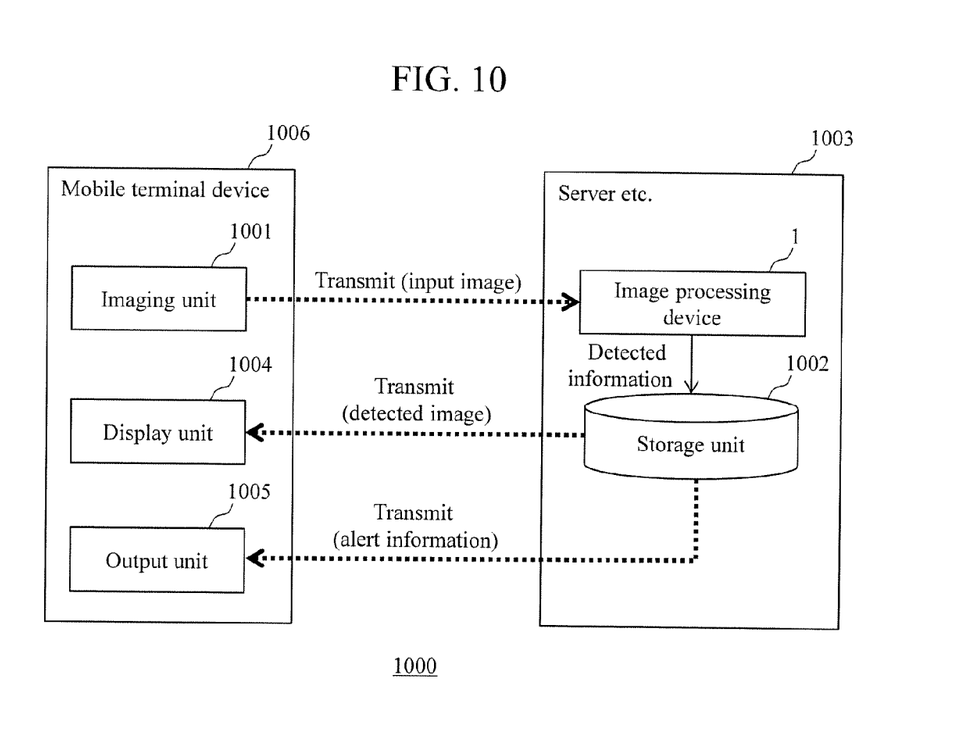
FIG. 10 is a diagram showing the schematic configuration of a warning system that has mounted thereon the image processing device of the present invention.

FIG. 10 is a functional block diagram showing the configuration of a warning system 1000 in accordance with the third embodiment of the present invention. The warning system 1000 includes a server etc. 1003 and a mobile terminal device 1006.

The mobile terminal device 1006 is a device like a smartphone, for example, and includes an imaging unit 1001 that captures image data, a display unit 1004 that displays a detected image transmitted from the server etc. 1003, and an output unit 1005 that outputs alert information transmitted from the server etc. 1003. The mobile terminal device 1006 also includes, though not shown, a communication device that transmits image data to the server etc. 1003 and receives data transmitted from the server etc. 1003.

The server etc. 1003 includes the image processing device 1 that performs image processing in accordance with the first embodiment of the present invention on the image data transmitted from the mobile terminal device 1006, and a storage unit 1002 that stores a detected image output from the image processing device 1. The server etc. 1003 also includes, though not shown, a communication device that receives image data transmitted from the mobile terminal device 1006 and transmits the detected image data and alert information to the mobile terminal device 1006.

The image processing device 1 detects objects, such as attachments on roads, from image data captured with the imaging unit 1001. In addition, the image processing device 1 sets a sign, such as a speed sign, on a reference image to detect a sign from the image data.

The display unit 1004 displays the detected image of the speed sign or the like, which has been transmitted from the server etc. 1003, on a display screen (not shown) of the mobile terminal device 1006 (e.g., smartphone).

The output unit 1005 outputs alert information, which has been transmitted from the server etc. 1003, from a speaker of the mobile terminal device 1006, and displays the alert information on the display screen (not shown).

Further, an image (i.e., detected image) of a point at which an alert has been output may be registered in the server etc. 1003 and/or the mobile terminal device 1006. At this time, as described in the first embodiment, the image may be registered if the detection frequency is greater than or equal to a predetermined threshold value Th_h.

According to the third embodiment, it is possible to provide a warning system by detecting a sign, such as a speed sign, from a video captured with a vehicle-mounted smart phone, and transmitting a set of the detected image of the sign and alert information to the smartphone or the like.

(4) Fourth Embodiment

Figure 11:
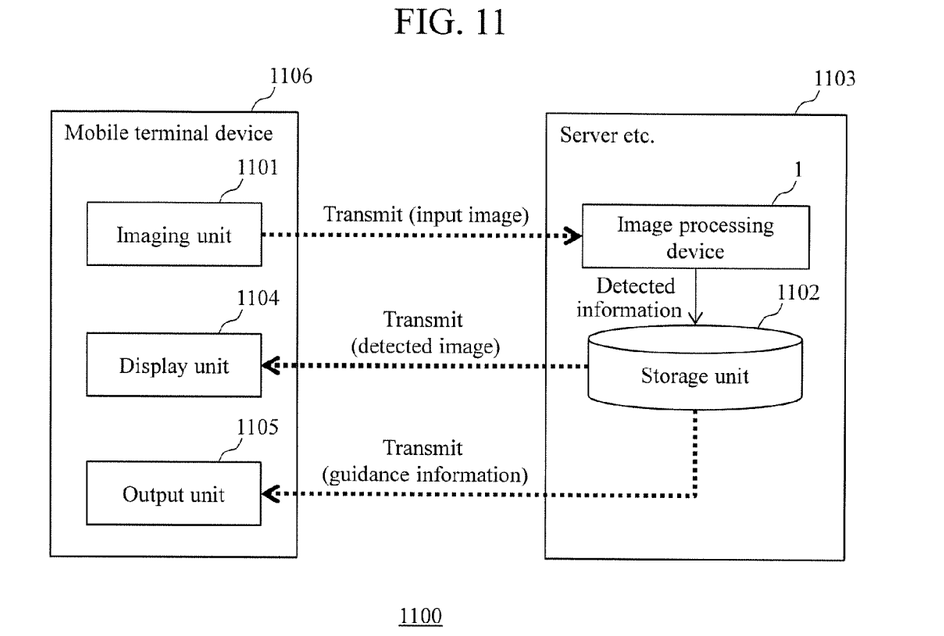
FIG. 11 is a diagram showing the schematic configuration of a simple guidance system that has mounted thereon the image processing device of the present invention.

FIG. 11 is a functional block diagram showing the configuration of a simple guidance system 1100 in accordance with the fourth embodiment of the present invention. The simple guidance system 1100 includes a server etc. 1103 and a mobile terminal device 1106.

The mobile terminal device 1106 is a device like a smartphone, for example, and includes an imaging unit 1101 that captures image data, a display unit 1104 that displays a detected image transmitted from the server etc. 1103, and an output unit 1105 that outputs guidance information transmitted from the server etc. 1103. The mobile terminal device 1106 also includes, though not shown, a communication device that transmits image data to the server etc. 1103 and receives data transmitted from the server etc. 1103.

The mobile terminal device 1106 can transmit image data by switching between low-quality image data (e.g., less than or equal to 5 Mbps) and high-quality image data (e.g., greater than or equal to 10 Mbps) depending on the available bandwidth. Accordingly, image data can be transmitted even when there is a limitation on the bandwidth.

Further, when transmitting high-quality image data, it is also possible to transmit the image data by trimming a region that may contain a signboard with a high possibility, or reducing the image size. This is because when the size of high-quality image data is reduced, the image data can be processed with higher accuracy than when the size of low-quality image data is reduced. Accordingly, the accuracy of the detection process of the image processing device can be improved.

The server etc. 1103 includes an image processing device 1 that performs image processing in accordance with the first embodiment of the present invention on the image data transmitted from the mobile terminal device 1106, and a storage unit 1102 that stores a detected image output from the image processing device 1. That the server etc. 1103 also includes, though not shown, a communication device that receives image data transmitted from the mobile terminal device 1106 and transmits the detected image data and guidance information to the mobile terminal device 1106.

The server etc. 1103 can, after processing the image data transmitted from the mobile terminal device 1106, issue an instruction to the mobile terminal device 1106 to transmit image data with higher quality than the previously received image data as needed, for example, upon receiving an instruction from a user. Accordingly, it becomes possible to reduce a load on the image processing device by analyzing an image at only a necessary position using high-quality image data and analyzing images at other positions using low-quality image data.

The image processing device 1 detects objects, such as attachments on roads, from image data captured with the imaging unit 1101. In addition, the image processing device 1 sets a sign, such as a direction signboard (i.e., signpost), on a reference image to detect a direction signboard from the image data. Further, the image processing device 1 detects a guidance direction by performing pattern matching on arrows or characters on the direction signboard, for example.

The display unit 1104 displays the detected image of the direction signboard and the like, which has been transmitted from the server etc. 1103, on a display screen (not shown) of the mobile terminal device 1106 (e.g., smartphone).

The output unit 1105 outputs the guidance information, which has been transmitted from the server etc. 1103, from a speaker of the mobile terminal device 1106, and displays the information on the display screen (not shown).

According to the fourth embodiment, it is possible to provide a simple guidance system by detecting a sign, such as a direction signboard, from a video captured with a vehicle-mounted smartphone, and transmitting a set of the detected image of the sign and the guidance information to the smartphone or the like.

(5) Conclusion (i) An image processing device in accordance with the present invention executes a process of converting the color space of a target image and acquiring color information on the converted color space, a process of calculating, for the target image, a first average value indicating the average value of the brightness of color information on a target region that contains an object to be detected, a process of comparing, for the target region, the brightness of color information on each pixel with the first average value to generate a corrected image with corrected brightness/darkness, and a process of extracting the object on the basis of the corrected image. More specifically, as shown in Formula 9, brightness/darkness are corrected using information on the target image (i.e., image N: current image) so that pixels that are darker than the average value of the brightness of color information (i.e., the value a or the value b) become darker and pixels that are brighter than the average value become brighter, whereby a corrected image (i.e., image with further emphasized brightness/darkness) is generated. In such a case, it is also possible to introduce a magnification value v and correct brightness/darkness by also taking into consideration the average value of the brightness of color information on the past images (i.e., images of up to the image N−1). As a desired object is extracted (detected) from a target image through correction of brightness/darkness as described above, it becomes possible to, even when the brightness of an image in a video changes depending on the running direction of the moving vehicle, detect an object in the background by separating the object in the background from the background of the image. When past images are taken into consideration, it becomes possible to separate a region in each image in accordance with the brightness of the image that changes with time.

Then, the image processing device compares a reference image prepared in advance with the object extracted (detected) from the target image so as to identify the object. Accordingly, it becomes possible to identify what is the extracted object.

When the image is a low bit-rate image captured with a smartphone or the like, for example, the number of gray levels of the reference image is reduced (adjusted), and the reference image with the reduced number of gray levels is compared with the detected object image, so that the Bhattacharyya distance between the two histograms is calculated. If the distance is less than a predetermined threshold value (Th_R), similarity is determined to be high. Accordingly, it becomes possible to, even when some contours in an image become unclear due to block noise during low bit-rate image transmission, suppress the influence of block noise contained in the low bit-rate image, and thus allow detection of the object in the background by separating the object in the background from the background of the image.

Further, the image processing device may be configured to, using positional information (i.e., GPS information) acquired when a target image N was captured, accumulate the positions of an identified object obtained by an indefinite number of users or the positions of an identified object obtained from a plurality of processing results of the same user, and determine the reliability of the identified object in accordance with the detection frequency obtained as a result of the accumulation. Accordingly, it becomes possible to provide information on the correct position of the identified object to a user.

When an image is captured with a smartphone, there may be cases where the aspect ratio of the image at a time point when the image was captured differs from the aspect ratio of the image stored in a memory. In such a case, if the image is read from the memory as a target image, the image processing device executes a process of correcting expansion of the target image by adjusting the aspect ratio of the image. Accordingly, it becomes possible to modify the expanded image, accurately extract a desired object, and identify the object.

(ii) According to the second embodiment, it is possible to provide a POI information creation system that detects a specific signboard, which indicates facility information or spot information, from a video captured with a vehicle-mounted smartphone, and recognizes the specific signboard.
(iii) According to the third embodiment, it is possible to provide a warning system that detects a sign, such as a speed sign, from a video captured with a vehicle-mounted smartphone and recognizes the sign.
(iv) According to the fourth embodiment, it becomes possible to provide a simple guidance system that detects a sign, such as a direction signboard, from a video captured with a vehicle-mounted smartphone, and recognizes the direction signboard.
(v) In each of the embodiments described above, the following variations are possible.

Although the color space conversion unit 12 creates an image by converting the color space of the input image into a Lab color space, the image may also be converted into an image of another color space, such as a HSV color space. In such a case also, and similar advantageous effects are provided.

Although the object detection unit 14 has determined similarity between the reference image and the detected object image using Formula 11, the similarity may also be determined using one of B32(r), B32(g), or B32(b) or using each combination. In such a case also, similar advantageous effects are provided.
(vi) It should be noted that the present invention can also be realized by a program code of software that implements the function of the embodiment. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the function of the aforementioned embodiment, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, CD-R, a magnetic tape, a nonvolatile memory card, ROM, or the like is used.

Further, based on an instruction of the program code, an OS (operating system) running on the computer or the like may perform some or all of actual processes, and the function of the aforementioned embodiment may be implemented by those processes. Furthermore, after the program code read from the storage medium is written to the memory in the computer, the CPU or the like of the computer may, based on the instruction of the program code, perform some or all of the actual processes, and the function of the aforementioned embodiment may be implemented by those processes.

Moreover, the program code of the software that implements the function of the embodiment may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage means or the storage medium and execute the program code.

Finally, the process and technology described herein may be implemented substantially by any combination of components without being related to any specific device. Further, various types of general-purpose devices can be used in accordance with the method described herein. It may be found to be advantageous to construct a dedicated device to execute the steps of the method described herein. In addition, various inventions can be formed by appropriately combining a plurality of components disclosed in the embodiment. For example, some of the components shown in the embodiment may be removed. Further, the components in different embodiments may be appropriately combined. Although the present invention has been described with reference to specific examples, such examples are shown not for limiting purposes but for explanation purposes in all aspects. One of ordinary skill in the art may appreciate that there are a number of combinations of hardware, software, and firmware that are suitable for implementing the present invention. For example, the software described herein may be implemented by a wide range of programs or script languages, such as an assembler, C/C++, perl, Shell, PHP, or Java (registered trademark).

Further, in the aforementioned embodiments, the control lines and information lines represent those that are considered to be necessary for description purposes, and represent not all control lines and information lines that are necessary for a product. In practice, almost all structures may be considered to be mutually connected.

Besides, other implementations of the present invention are apparent to one of ordinary skill in the art from consideration of the specification and embodiments of the present invention disclosed herein. A variety of configurations and/or components in the described embodiments may be used either alone or in combination.

DESCRIPTION OF SYMBOLS

1 Image processing device
10 Input unit
11 Image correction unit
12 Color space conversion unit
13 Brightness/darkness correction unit
14 Object detection unit
15 Reliability determination unit
16 Drawing unit
17 Recording unit
91 Control unit
900 POI information creation system
1000 Warning system
1100 Simple guidance system

What is claimed is:
1. An image processing device comprising:
a processor configured to execute various programs for performing image processing on a target image; and
a memory that stores a result of the image processing, wherein
the processor is configured to execute
a process of converting a color space of the target image and acquiring color information on the converted color space,
a process of calculating, for the target image, a first average value indicating an average value of brightness of color information on a target region that contains an object to be detected,
a process of comparing, for the target region, brightness of color information on each pixel with the first average value to generate a corrected image with corrected brightness/darkness, and
a process of extracting the object on the basis of the corrected image, wherein the processor is configured to, for a past image that has been captured prior to the target image, calculate a second average value indicating an average value of brightness of color information on a region corresponding to the target region of the target image, and generate the corrected image by taking into consideration a ratio between the first average value and the second average value.

2. The image processing device according to claim 1, wherein the processor is configured to extract the object by separating the object from a background of the corrected image.

3. The image processing device according to claim 1, wherein the processor is configured to identify the object by comparing a reference image prepared in advance with the extracted image.

4. The image processing device according to claim 3, wherein the processor is configured to identify the object by adjusting gray levels of the reference image in accordance with a bit rate of the target image and determining similarity between the adjusted reference image and an image of the object.

5. The image processing device according to claim 3, wherein the processor is configured to execute a process of accumulating positions of the identified object using positional information acquired when the target image was captured, and determine reliability of the identified object in accordance with a detection frequency obtained as a result of the accumulation.

6. The image processing device according to claim 1, wherein the processor is configured to, for the input target image, execute a process of correcting expansion of the target image by adjusting an aspect ratio of the image.

7. A Point of Interest (POI) information creation system comprising:
a mobile terminal device including an imaging device configured to capture image data; and
a server including the image processing device according to claim 1, wherein
the mobile terminal device is configured to transmit the image data to the server,
the server is configured to process the received image data with the image processing device, store an image of an extracted object in a memory, and transmit the image to the mobile terminal device, and
the mobile terminal device is configured to display a received image of the extracted object on a display device.

8. A warning system comprising:
a mobile terminal device including an imaging device configured to capture image data; and
a server including the image processing device according to claim 1, wherein
the mobile terminal device is configured to transmit the image data to the server,
the server is configured to process the received image data with the image processing device, store an image of an extracted object in a memory, and transmit the image of the extracted object and alert information to the mobile terminal device, and
the mobile terminal device is configured to display the received image of the extracted object on a display device, and output the alert information.

9. A guidance system comprising:
a mobile terminal device including an imaging device configured to capture image data; and
a server including the image processing device according to claim 1, wherein
the mobile terminal device is configured to transmit the image data to the server,
the server is configured to process the received image data with the image processing device to extract an image of a signpost, store the extracted image of the signpost in a memory, and transmit the extracted image of the signpost and guidance information to the mobile terminal device, and
the mobile terminal device is configured to display the received image of the extracted signpost on a display device and output the guidance information.

10. An image processing method for identifying a desired object in a target image, the method comprising the following steps executed by a processor, the processor being configured to execute various programs for performing image processing on the target image:
converting a color space of the target image and acquiring color information on the converted color space;
calculating, for the target image, a first average value indicating an average value of brightness of color information on a target region that contains an object to be detected;
comparing, for the target region, brightness of color information on each pixel with the first average value to generate a corrected image with corrected brightness/darkness;
extracting the object by separating the object from a background of the corrected image, and comparing a reference image prepared in advance with the extracted object, thereby identifying the object; and
calculating, for a past image that has been captured prior to the target image, a second average value indicating an average value of brightness of color information on a region corresponding to the target region of the target image, and generating the corrected image by taking into consideration a ratio between the first average value and the second average value.

11. The image processing method according to claim 10, further comprising the following step performed by the processor: identifying the object by adjusting gray levels of the reference image in accordance with a bit rate of the target image and determining similarity between the adjusted reference image and the image of the object.

12. The image processing method according to claim 10, further comprising the following step performed by the processor: accumulating positions of the identified object using positional information acquired when the target image was captured, and determining reliability of the identified object in accordance with a detection frequency obtained as a result of the accumulation.

13. The image processing method according to claim 10, further comprising the following step performed by the processor: correcting, for the input target image, expansion of the target image by adjusting an aspect ratio of the image.

* * * * *